United States Patent
Mo et al.

(10) Patent No.: US 10,284,419 B2
(45) Date of Patent: May 7, 2019

(54) USER EQUIPMENT AND DATA CONNECTION RECOVERY METHOD THEREOF

(71) Applicant: MEDIATEK INC., Hsinchu (TW)

(72) Inventors: Shang-Ru Mo, Kaohsiung (TW); Yung Hsiang Hsieh, New Taipei (TW); Yen-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 164 days.

(21) Appl. No.: 15/614,758

(22) Filed: Jun. 6, 2017

(65) Prior Publication Data

US 2018/0351785 A1    Dec. 6, 2018

(51) Int. Cl.
*H04W 24/04* (2009.01)
*H04W 40/24* (2009.01)
*H04W 48/18* (2009.01)
*H04W 76/00* (2018.01)
*H04L 12/24* (2006.01)
*H04W 48/00* (2009.01)
*H04W 76/18* (2018.01)
*H04W 76/19* (2018.01)
*H04W 36/00* (2009.01)

(52) U.S. Cl.
CPC ......... *H04L 41/0654* (2013.01); *H04W 48/17* (2013.01); *H04W 76/18* (2018.02); *H04W 76/19* (2018.02); *H04W 36/0005* (2013.01); *H04W 36/0033* (2013.01)

(58) Field of Classification Search
None
See application file for complete search history.

(56) References Cited

U.S. PATENT DOCUMENTS

| 2010/0265818 A1* | 10/2010 | Chen | H04B 1/74 370/217 |
| 2012/0002537 A1* | 1/2012 | Bao | H04W 24/04 370/221 |
| 2012/0057473 A1* | 3/2012 | Nguyen | H04W 24/00 370/245 |
| 2013/0182563 A1 | 7/2013 | Johansson et al. | |
| 2014/0187236 A1* | 7/2014 | Chiang | H04W 24/04 455/423 |

(Continued)

FOREIGN PATENT DOCUMENTS

| CN | 103348733 A | 10/2013 |
| CN | 103283180 B | 12/2015 |

OTHER PUBLICATIONS

Office Action issued in corresponding Taiwan Patent Application No. 106123230 dated May 28, 2018.

*Primary Examiner* — Duc T Duong
(74) *Attorney, Agent, or Firm* — McClure, Qualey & Rodack, LLP

(57) ABSTRACT

An user equipment and a data connection recovery method thereof are provided. The user equipment transmits at least one UDP query packets to a robust server via the base station, and determines that there is no response from the robust server during a default period. Then the user equipment determines that a data connection with a backhaul network is abnormal between the base station and the backhaul network. Accordingly, the user equipment transmits a trigger packet to the backhaul network via the base station under NAS protocol and recovers the data connection with the backhaul network.

10 Claims, 4 Drawing Sheets

(56) References Cited

U.S. PATENT DOCUMENTS

| | | | | |
|---|---|---|---|---|
| 2014/0281667 A1* | 9/2014 | Yu | .................. | H04L 61/1511 |
| | | | | 714/4.1 |
| 2015/0146520 A1* | 5/2015 | Zakrzewski | .......... | H04W 24/04 |
| | | | | 370/221 |
| 2016/0345192 A1* | 11/2016 | Garg | .................. | H04W 24/04 |
| 2017/0048775 A1* | 2/2017 | Kim | .................. | H04W 76/18 |
| 2018/0063731 A1* | 3/2018 | Ashrafi | ............. | H04B 10/1129 |
| 2018/0227372 A1* | 8/2018 | Sharma | .............. | H04L 12/1859 |

* cited by examiner

USER EQUIPMENT AND DATA CONNECTION RECOVERY METHOD THEREOF

CROSS-REFERENCES TO RELATED APPLICATIONS

Not applicable.

BACKGROUND OF THE INVENTION

Field of the Invention

The present invention relates to a user equipment and a data connection recovery method thereof. More particularly, the present invention relates to a user equipment and a data connection recovery method without breaking up Packet Data Network (PDN) connection.

Descriptions of the Related Art

For a conventional user equipment, Packet Switch (PS) data fails sometimes in some scenarios. For example, when a user equipment roams from one country to another country and needs to switch between the different operators under the circumstances: (1) when a user equipment is under 4G network in A country and roams from A country to B country under 3G network, PS data may fail; (2) when a user equipment is turned off under 4G network in A country, roams from A country to B country and is turned on in B country under 3G network, PS data may fail.

Normally, user try the following solutions for recovering PS data: (1) rebooting the user equipment; (2) switching to flight mode and switching back; (3) re-attaching GPRS; or (4) re-activating Packet Data Protocol (PDP). However, all the above solutions need to break up the original PDN connection and the original IP address will be changed. Obviously, it causes inconvenience to the user.

Accordingly, an urgent need exists in the art to eliminate the shortcomings of the conventional technology so as to improve the user experience.

SUMMARY OF THE INVENTION

The primary objective of this invention is to provide a data connection recovery method for use in an user equipment. The user equipment is connected with a base station. The method comprises: (a) transmitting, by the user equipment, at least one UDP query packet to a robust server via the base station, wherein the robust server is a server which provides network services steadily; (b) determining, by the user equipment, that there is no response from the robust server during a default period after step (a); (c) determining, by the user equipment, that a data connection with a backhaul network is abnormal between the base station and the backhaul network based on the result of step (b); (d) transmitting, by the user equipment, a trigger packet to the backhaul network via the base station under non-access stratum protocol based on the result of step (c); (e) recovering, by the user equipment, the data connection with the backhaul network after step (d).

Another objective of this invention is to provide a user equipment which comprises a transceiver and a processor. The transceiver is connected with a base station and configured to transmit at least one UDP query packet to a robust server via the base station. The robust server is a server which provides network services steadily. The processor is configured to: determine that there is no response from the robust server during a default period; determine that a data connection with a backhaul network is abnormal between the base station and the backhaul network based on the result of determining that there is no response from the robust server during the default period.

The transceiver is further configured to transmit a trigger packet to the backhaul network via the base station under non-access stratum protocol based on the result of that the processor determines that the data connection with the backhaul network is abnormal between the base station and the backhaul network. The processor is further configured to recover the data connection with the backhaul network after the transceiver transmits the trigger packet to the backhaul network via the base station under non-access stratum protocol.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. In the following embodiments and the attached drawings, elements unrelated to the present invention are omitted from depiction; and dimensional relationships among individual elements in the attached drawings are illustrated only for ease of understanding, but not to limit the actual scale.

Figure 1A:
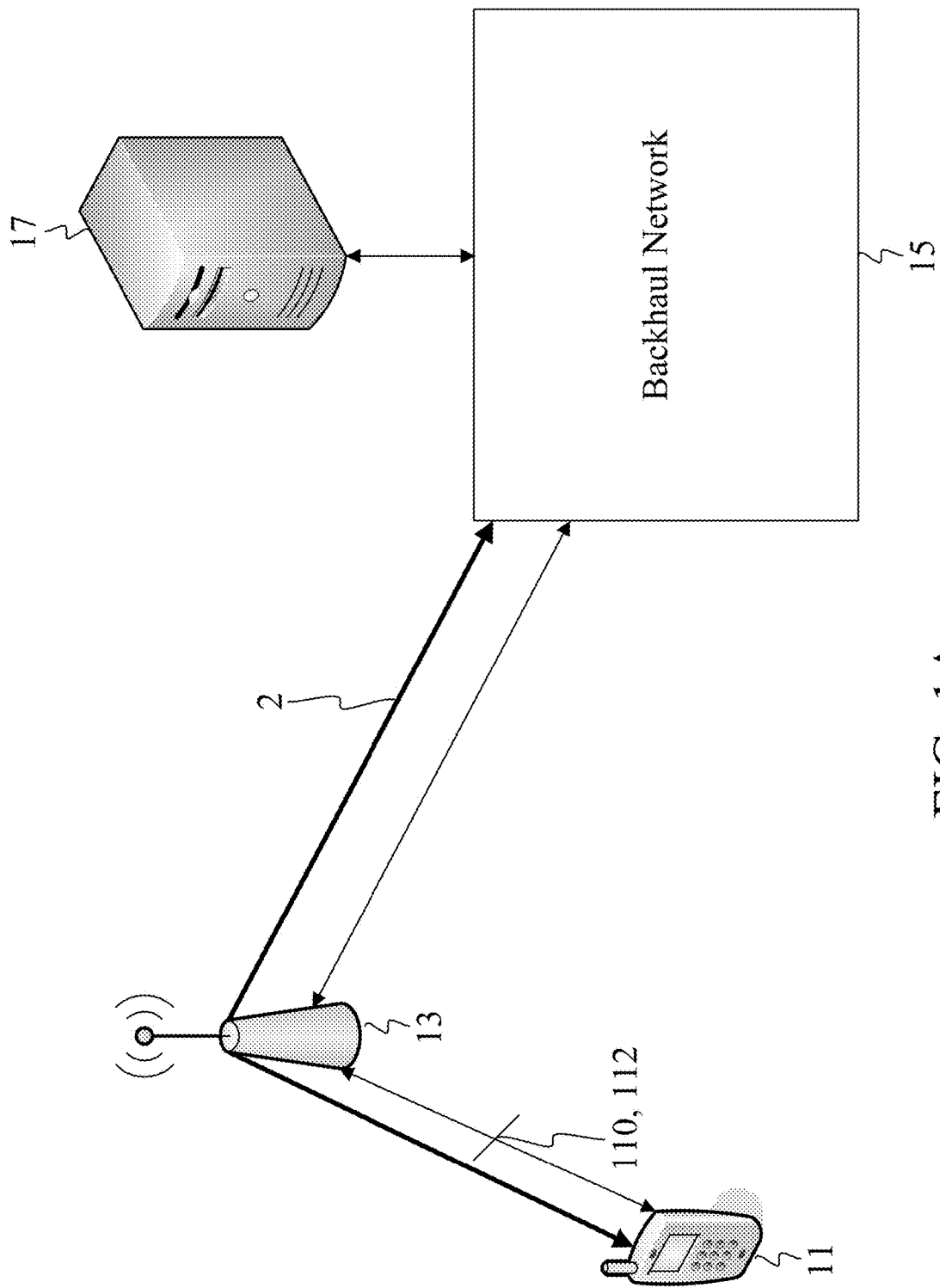
FIG. 1A is a schematic views of a network environment of a user equipment according to a first embodiment of the present invention.
Figure 1B:
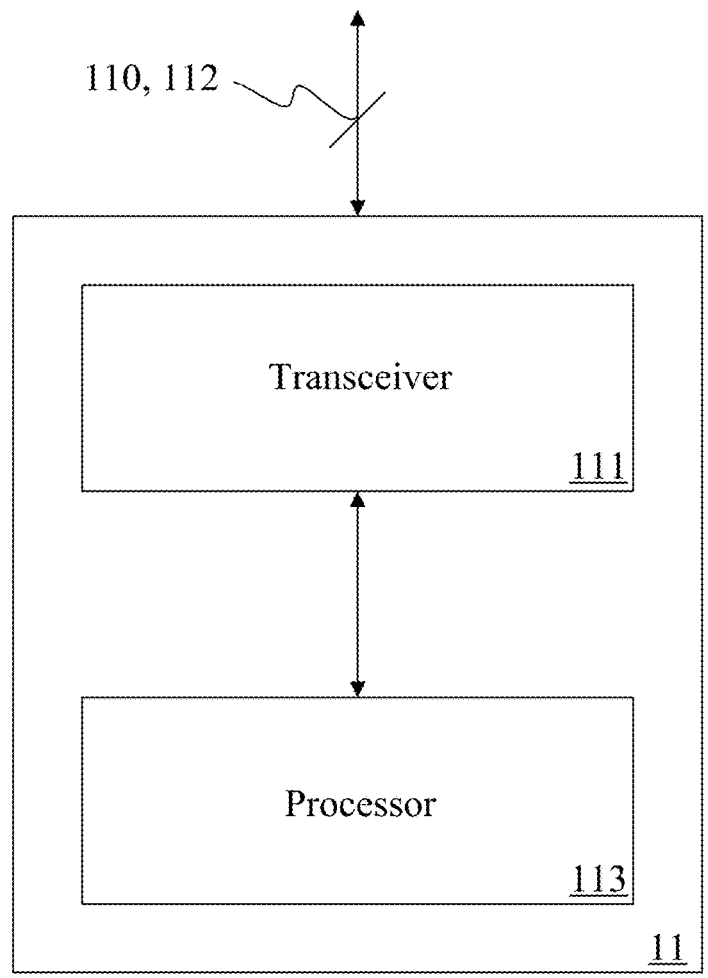
FIG. 1B is a block diagram of the user equipment according to the first embodiment of the present invention.

Please refer to FIGS. 1A~1B. FIG. 1A is a schematic views of a network environment of a user equipment 11 according to a first embodiment of the present invention. FIG. 1B is a block diagram of the user equipment 11 according to the first embodiment of the present invention. The user equipment 11 comprises a transceiver 111 and a processor 113. The user equipment 11 is connected with a base station 13 via the transceiver 111. Interactions between the elements thereof will be further described hereinbelow.

In the first embodiment, the user equipment 11 is capable of checking the status of the data connection periodically via an UDP packet. Particularly, the transceiver 111 of the user equipment 11 firstly transmits at least one UDP query packet 110 to a robust server 17 via the base station 13. If the user equipment 11 receives an UDP response from the robust server 17, it means that a data connection 2 with a backhaul network 15 still works. However, if the user equipment 11 has not received any response from the robust server 17 for a while, it means that the data connection 2 with the backhaul network 15 may be abnormal.

It should be noted that the robust server 17 can be a server which provides network services steadily. Accordingly, it is assumed that user equipment must receive UDP response from the robust server after transmitting UDP query to robust server; otherwise, it is determined that the data connection between user equipment and backhaul network is abnormal.

In addition, in other embodiments, for purpose of enhancing the accuracy of checking the status of the data connection, the user equipment is capable of transmitting the UDP query packets to a plurality robust servers via the base station. Therefore, since it is nearly impossible that all robust servers crash at the same time, the result of checking the status of the data connection can be further confirmed.

More specifically, similarly, if the user equipment receives one UDP response from any of the robust servers, it means that data connection with backhaul network still works. However, if the user equipment has not received any response from any of the robust server for a while, it means that the data connection with the backhaul network may be abnormal.

In the first embodiment, the processor 113 of the user equipment 11 determines that there is no response from the robust server 17 during a default period (not shown) so that the processor 113 of the user equipment 11 determines that the data connection 2 with the backhaul network 15 is abnormal between the base station 13 and the backhaul network 15. Therefore, the user equipment 11 has to recover the data connection.

Next, the user equipment 11 tries to recover the data connection 2 based on non-access stratum (NAS) protocol. Specifically, for the purpose of maintaining original IP address assigned to the user equipment 11, the transceiver 111 of the user equipment 11 first transmits a trigger packet 112 to the backhaul network 15 via the base station 13 under NAS protocol after the data connection 2 of the user equipment 11 and the backhaul network 15 is determined abnormal.

Afterwards, since the backhaul network 15 is notified of the trigger of the data connection 2 via the trigger packet 112 under NAS protocol, the backhaul network 15 is capable of checking and re-initialing the data connection 2 accordingly. Subsequently, the processor 113 of the user equipment 11 recovers the data connection 2 with the backhaul network 15 under NAS protocol. Therefore, when the recovery of the data connection 2 under NAS protocol is successful, the IP address of the user equipment 11 used in the data connection 2 is maintained.

Figure 2:
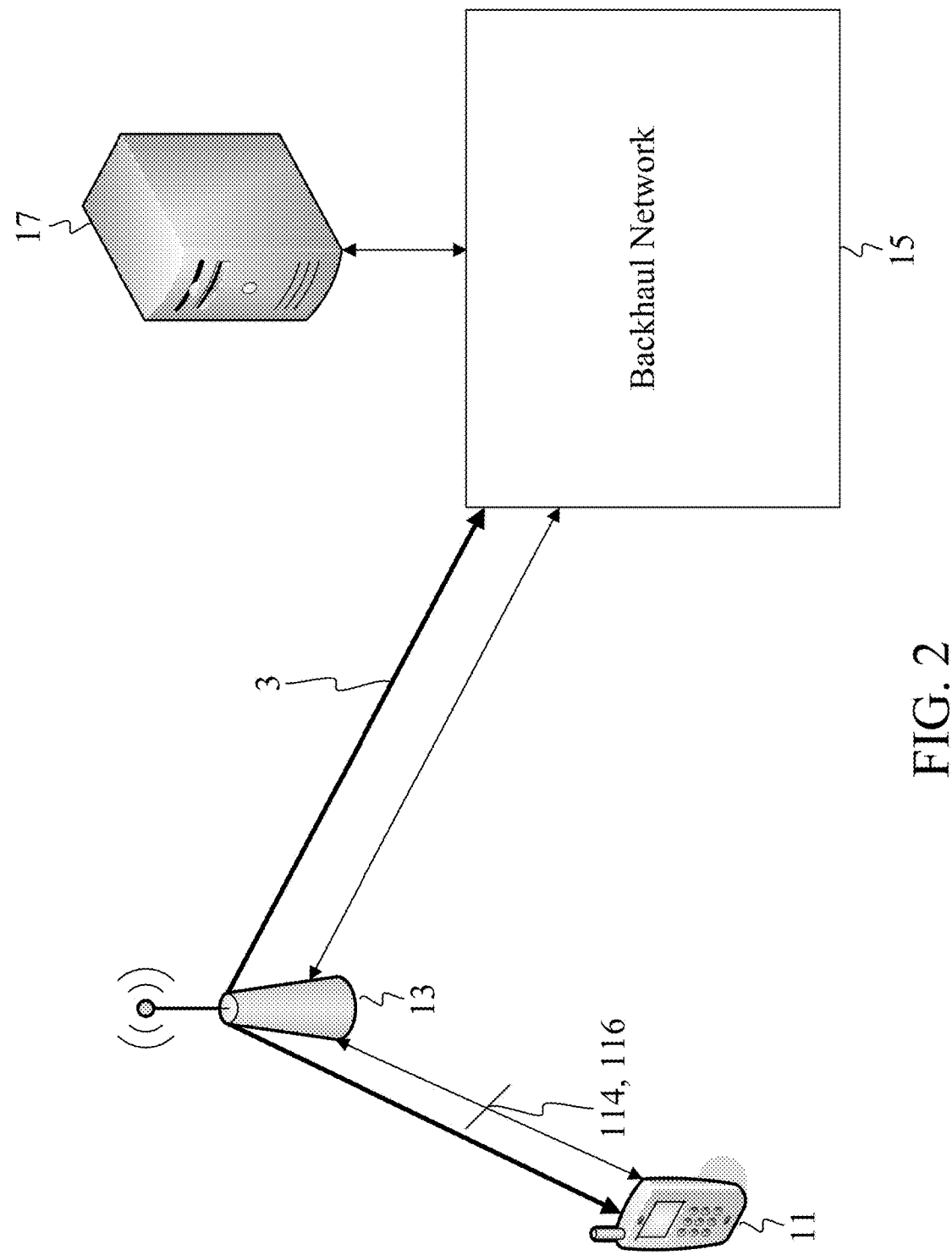
FIG. 2 is a schematic views of a network environment of a user equipment according to a second embodiment of the present invention.

Please refer to FIG. 2 which is a schematic views of a network environment of the user equipment 11 according to a second embodiment of the present invention. The network architecture of the second embodiment is similar to that of the first embodiment, so elements labeled by the same reference symbols have the same functions and thus will not be further described herein. The second embodiment mainly further illustrates the details of detecting and recovering abnormal data connection.

Similarly, in the second embodiment, the user equipment 11 is capable of checking the status of the data connection 3 periodically via an UDP packet. Particularly, the transceiver 111 of the user equipment 11 firstly transmits a plurality of UDP query packets 114 to the robust server 17 via the base station 13. If the user equipment 11 receives an UDP response from the robust server 17, it means that the data connection 3 with the backhaul network 15 still works. However, if the user equipment 11 has not received any response from the robust server 17 during for the transmission of the plurality of UDP query packets 114, it means that the data connection 3 with the backhaul network 15 may be abnormal.

It should be noted that, in the second embodiment, the plurality of UDP query packets 114 comprise a Domain Name Server (DNS) query packet, a Network Time Protocol (NTP) query packet, an Internet Control Message Protocol (ICMP) query packet or a combination of them while the robust server 17 can be a server which provides network services steadily such as OpenDNS server, Google Network Time Protocol (NTP) server or Facebook server. Accordingly, it is assumed that user equipment must receive UDP response after transmitting UDP query to theses robust server; otherwise, it is determined that the data connection between user equipment and backhaul network is abnormal since it is nearly impossible that these robust server crash at the same time.

In the second embodiment, the processor 113 of the user equipment 11 determines that there is no response from the robust server 17 during a default period so that the processor 113 of the user equipment 11 determines that the data connection 3 with the backhaul network 15 is abnormal between the base station 13 and the backhaul network 15. Therefore, the user equipment 11 has to recover the data connection 3.

Next, the user equipment 11 tries to recover the data connection 3 based on NAS protocol. Specifically, for the purpose of maintaining original IP address assigned to the user equipment 11, the transceiver 111 of the user equipment 11 first transmits a trigger packet 116 to the backhaul network 15 via the base station 13 under NAS protocol after the data connection 3 of the user equipment 11 and the backhaul network 15 is determined abnormal.

Afterwards, since the backhaul network 15 is notified of the trigger of the data connection 3 via the trigger packet 112 under NAS protocol, the backhaul network 15 is capable of checking and re-initialing the data connection 3 accordingly. Subsequently, the processor 113 of the user equipment 11 recovers the data connection 3 with the backhaul network 15 under NAS protocol. Therefore, when the recovery of the data connection 3 under NAS protocol is successful, the IP address of the user equipment 11 used in the data connection 3 is maintained.

It should be noted that, in different network scenarios, different ways of triggering data connection under NAS protocol for purpose of maintaining IP address can be implemented. For example, the trigger of the data connection can be: (1) a Mobile-Station initiated Packet Data Protocol (PDP) Context Modification Procedure while the trigger packet is a PDP context modifying request; or (2) a Mobile-Station initiated Bearer Resource Modification Procedure while the trigger packet is a bearer resource modification request.

Otherwise, the trigger of the data connection can be initiated while the trigger packet is: (1) a data service request; (2) a routing area update (RAU) request; or (3) a tracking area update (TAU) request for hinting the backhaul network to recover the data connection. Apparently, the combination of the above implementations is possible for the user equipment to trigger the recovery of the data connection.

It should be noted that a hybrid solution, which includes the mentioned ways, of triggering data connection under NAS protocol can be implemented as well. Particularly, the hybrid solution includes: (a) triggering the data connection by initialing Mobile-Station initiated PDP Context Modification Procedure; (b) triggering the data connection by initialing Mobile-Station initiated Bearer Resource Modification Procedure; (c) triggering the data connection by transmitting data service request; (d) triggering the data connection by transmitting RAU request; and (e) triggering the data connection by transmitting TAU request. Accordingly, the recovery of the data connection is more robust.

Figure 3:
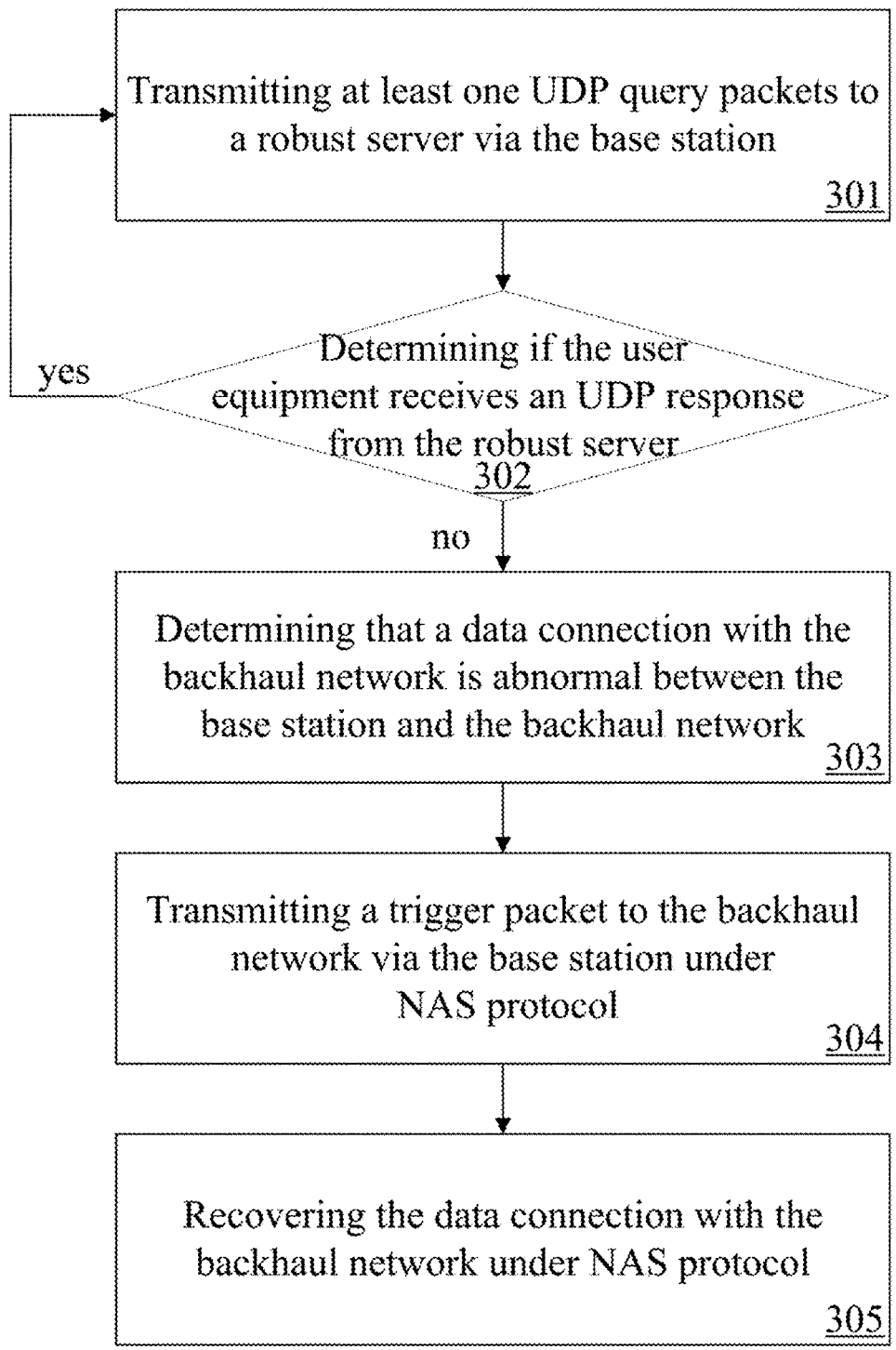
FIG. 3 is a flowchart diagram of a data connection recovery method according to a third embodiment of the present invention.

A third embodiment of the present invention is a data connection recovery method, a flowchart diagram of which is shown in FIG. 3. The method of the third embodiment is for use in an user equipment (e.g., the user equipment of a previous embodiment). The user equipment is connected with a base station. Detailed steps of the ninth embodiment are described as follows.

Firstly, the user equipment is capable of checking the status of the data connection periodically via an UDP packet. Step 301 is executed by the user equipment to transmit at least one UDP query packets to a robust server via the base station. It should be noted that the robust server is a server which provides network services steadily.

Next, step 302 is executed by the user equipment to determine if the user equipment receives an UDP response from the robust server. If it is positive, it means that the data connection with a backhaul network still works. Then step 301 is repeated. However, if the user equipment has not received any response from the robust server during a default period, step 303 is executed by the user equipment to determine that a data connection with the backhaul network is abnormal between the base station and the backhaul network.

Afterwards, the user equipment has to recover the data connection. More specifically, step 304 is executed by the user equipment to transmit a trigger packet to the backhaul network via the base station under NAS protocol based on the result of step 303.

And then, since the backhaul network is notified of the trigger of the data connection via the trigger packet under NAS protocol, the backhaul network is capable of checking and re-initialing the data connection accordingly. Subsequently, step 305 is executed by the user equipment to recover the data connection with the backhaul network under NAS protocol. Therefore, when the recovery of the data connection under NAS protocol is successful, the IP address of the user equipment used in the data connection is maintained.

It should be noted that, in the third embodiment, the at least one UDP query packet comprises a DNS query packet, a NTP query packet, an ICMP query packet or a combination of them while the robust server can be a server which provides network services steadily such as OpenDNS server, Google NTP server or Facebook server.

Similarly, in the third embodiment, for different network scenarios, there are different implementations of triggering data connection under NAS protocol. For example, the trigger of the data connection can be: (1) a Mobile-Station initiated PDP Context Modification Procedure while the trigger packet is a PDP context modifying request; or (2) a Mobile-Station initiated Bearer Resource Modification Procedure while the trigger packet is a bearer resource modification request.

Otherwise, the trigger of the data connection can initiated while the trigger packet is: (1) a data service request; (2) a RAU request; or (3) a TAU request for hinting the backhaul network to recover the data connection. Apparently, the combination of the above implementations is possible for the user equipment to trigger the recovery of the data connection.

According to the above descriptions, the user equipment and the data connection recovery method thereof according to the present invention can check the data connection via UDP packet, and recover the abnormal data connection under NAS protocol for maintaining the original IP address.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data connection recovery method for use in an user equipment, the user equipment being connected with a base station, comprising:
   (a) transmitting, by the user equipment, at least one UDP query packets to a robust server via the base station, wherein the robust server is a server which provides network services steadily;
   (b) determining, by the user equipment, that there is no response from the robust server during a default period after step (a);
   (c) determining, by the user equipment, that a data connection with a backhaul network is abnormal between the base station and the backhaul network based on the result of step (b);
   (d) transmitting, by the user equipment, a trigger packet to the backhaul network via the base station under non-access stratum protocol based on the result of step (c);
   (e) recovering, by the user equipment, the data connection with the backhaul network after step (d).

2. The data connection recovery method of claim 1, wherein the at least one UDP query packet comprises a DNS query packet, a NTP query packet or an ICMP query packet.

3. The data connection recovery method of claim 1, wherein the trigger packet is a PDP context modifying request or a bearer resource modification request.

4. The data connection recovery method of claim 1, wherein the trigger packet is a data service request.

5. The data connection recovery method of claim 1, wherein the trigger packet is a routing area update request or a tracking area update request.

6. A user equipment, comprising:
   a transceiver, being connected with a base station and configured to transmit at least one UDP query packet to a robust server via the base station, wherein the robust server is a server which provides network services steadily;
   a processor, being configured to:
      determine that there is no response from the robust server during a default period after the transceiver transmits the at least one UDP query packet;
      determine that a data connection with a backhaul network is abnormal between the base station and the backhaul network based on the result of determining that there is no response from the robust server during the default period;
   wherein the transceiver is further configured to transmit a trigger packet to the backhaul network via the base station under non-access stratum protocol based on the result of that the processor determines that the data connection with the backhaul network is abnormal between the base station and the backhaul network;

wherein the processor is further configured to recover the data connection with the backhaul network after the transceiver transmits the trigger packet to the backhaul network via the base station under non-access stratum protocol.

7. The user equipment of claim 6, wherein the at least UDP query packet comprises a DNS query packet, a NTP query packet or an ICMP query packet.

8. The user equipment of claim 6, wherein the trigger packet is a PDP context modifying request or a bearer resource modification request.

9. The user equipment of claim 6, wherein the trigger packet is a data service request.

10. The user equipment of claim 6, wherein the trigger packet is a routing area update request or a tracking area update request.

* * * * *